(12) United States Patent
Takahashi et al.

(10) Patent No.: US 11,165,291 B2
(45) Date of Patent: Nov. 2, 2021

(54) STATOR CORE SUPPORT DEVICE AND ROTATING ELECTRICAL MACHINE

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Norio Takahashi, Yokohama (JP); Masafumi Fujita, Yokohama (JP); Takahiro Sato, Kawasaki (JP); Hideyuki Nakamura, Shinagawa (JP); Ken Nagakura, Ebina (JP); Kazuma Tsujikawa, Kawasaki (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 640 days.

(21) Appl. No.: 16/050,005

(22) Filed: Jul. 31, 2018

(65) Prior Publication Data
US 2019/0052134 A1    Feb. 14, 2019

(30) Foreign Application Priority Data

Aug. 8, 2017 (JP) .............................. JP2017-153352
May 22, 2018 (JP) .............................. JP2018-098069

(51) Int. Cl.
*H02K 1/18*    (2006.01)
*H02K 5/24*    (2006.01)

(52) U.S. Cl.
CPC ............... *H02K 1/185* (2013.01); *H02K 5/24* (2013.01)

(58) Field of Classification Search
CPC .................................. H02K 1/185; H02K 5/24
See application file for complete search history.

(56) References Cited

U.S. PATENT DOCUMENTS

| 4,494,030 | A | 1/1985 | Mulach et al. |
| 6,104,116 | A * | 8/2000 | Fuller ................ H02K 1/16 310/216.124 |
| 6,346,760 | B1 * | 2/2002 | Boardman, IV ........ H02K 1/16 310/216.007 |
| 8,568,110 | B2 | 10/2013 | Takeshita |
| 8,829,769 | B1 | 9/2014 | Rao |
| 2004/0080230 | A1 * | 4/2004 | Shah ................ H02K 11/40 310/179 |
| 2010/0295407 | A1 | 11/2010 | Boardman, IV et al. |

FOREIGN PATENT DOCUMENTS

| CN | 102312865 A | 1/2012 |
| CN | 104106199 A | 10/2014 |
| JP | 09-285045 | 10/1997 |
| JP | 3456824 | 10/2003 |
| JP | 2011-250626 | 12/2011 |

* cited by examiner

*Primary Examiner* — Thienvu V Tran
*Assistant Examiner* — Bart Iliya
(74) *Attorney, Agent, or Firm* — Oblon, McClelland, Maier & Neustadt, L.L.P.

(57) ABSTRACT

A stator core support device according to an embodiment includes plural types of support members that support a stator core on a stator frame disposed radially outward. These support members are combined so as to form a closed circuit portion. Then, an insulating part for electrically insulating part of the closed circuit portion is provided.

9 Claims, 7 Drawing Sheets

STATOR CORE SUPPORT DEVICE AND ROTATING ELECTRICAL MACHINE

CROSS REFERENCE TO RELATED APPLICATIONS

This application is based upon and claims the benefit of priorities from the prior Japanese Patent Application No. 2017-153352, filed on Aug. 8, 2017, and, the prior Japanese Patent Application No. 2018-98069, filed on May 22, 2018, the entire contents of which are incorporated herein by reference.

FIELD

Embodiments described herein relate to a stator core support device and a rotating electrical machine.

BACKGROUND

Rotating electrical machines such as a generator and an electric motor include a rotor having a rotating shaft and a stator. Rotating electrical machines are roughly classified into an inner rotor type and an outer rotor type. Among them, in an inner rotor type rotating electrical machine, some stators include a cylindrical stator core formed so as to surround a rotor and a stator frame which covers the stator core from radially outside and is supported by the foundation. In such a rotating electrical machine, vibration may be generated in the stator by the magnetic attraction force generated by the rotation of the rotor. It is not desirable that this vibration propagate from the rotating electrical machine to the foundation. For this reason, in such a stator of a rotating electrical machine, a stator core support device including an elastic body such as a spring plate or a spring rod may be disposed between the stator core and the stator frame, and the stator core may be supported by the stator frame via the support device. This makes it possible to suppress the vibration from propagating to the outside of the stator.

Figure 8:
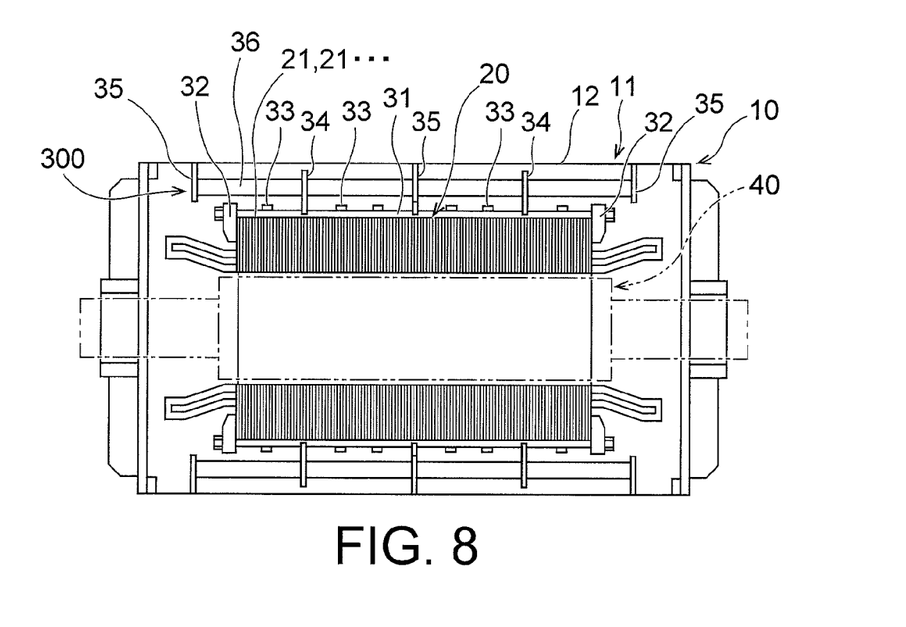
FIG. 8 is a schematic cross-sectional view of a rotating electrical machine including a general stator core support device for elastically supporting a stator core.

FIG. 8 is a schematic cross-sectional view showing an example of a rotating electrical machine including a general stator core support device for elastically supporting a stator core where the rotating electrical machine is cut along the axial direction. The axial direction means a direction along the rotation center axis of the rotor. In the example of FIG. 8, a stator frame 11 of a stator 10 has a cylindrical outer circumferential plate 12, and a stator core 20 is supported on the stator frame 11, particularly the outer circumferential plate 12 thereof via a stator core support device (hereinafter abbreviated as a support device) 300. The stator core 20 is formed in a cylindrical shape by laminating a plurality of annular laminated iron cores 21. A rotor 40 indicated by a two-dot chain line for the convenience of illustration is rotatably disposed radially inside of the stator core 20. A dovetail shaped groove is formed on the outer circumferential portion of each laminated iron core 21, and a plurality of these grooves is formed at intervals in the circumferential direction.

A support device 300 is a support device called a "spring rod type". The support device 300 includes a plurality of axial ribs 31 that holds a plurality of laminated iron cores 21 by fitting dovetail shaped grooves of the laminated iron cores 21, a pair of iron core pressing plates 32 (core end flange) for clamping the plurality of cylindrical laminated iron core 21 held by the ribs 31 from axial both sides, a plurality of annular iron core pressing rings 33 that surrounds and holds the ribs 31 from radially outside, a plurality of annular iron core support plates 34 that surrounds and holds the ribs 31 from radially outside and that protrudes radially outward from an iron core pressing ring 33, a plurality of annular partition plates 35 fixed to the inner circumferential surface of the outer circumferential plate 12 so as to be positioned coaxially with the outer circumferential plate 12 of the stator frame 11 and positioned radially outside the stator core 20, and a plurality of spring rods 36 extending in the axial direction to connect an iron core support plate 34 and the partition plate 35. In a large-sized rotating electrical machine, since the shape of the stator core is large, it is difficult to form an annular laminated iron core with one piece, and the laminated iron core may be divided in the circumferential direction in some cases. In the example shown in FIG. 8, the laminated iron core 21 is divided in the circumferential direction, and is composed of a plurality of sector-shaped divided bodies. The divided bodies which are adjacent in the axial direction are stacked in a state in which the sector-shaped bodies are shifted with each other by half of the interior angle of each sector-shaped body.

In such a support device 300, in a state in which the stator core 20 is disposed so that the central axis of the stator core 20 coincides with the central axis of the stator frame 11, a plurality of spring rods 36 disposed in the circumferential direction connects the iron core support plate 34 to the partition plate 35 fixed to the outer circumferential plate 12 of the stator frame 11. At this time, a spring rod 36 extends beyond axial both sides of the stator core 20, and the partition plate 35 and the iron core support plate 34 are alternately disposed in the axial direction. Therefore, the spring rod 36 is held by the adjacent partition plates 35 in a state of being supported at both ends (two points), and is connected to the iron core support plate 34 between the partition plates 35. As a result, the spring rod 36 bends against the radial displacement of the iron core support plate 34, and the stator core 20 can be elastically supported.

Figure 9:
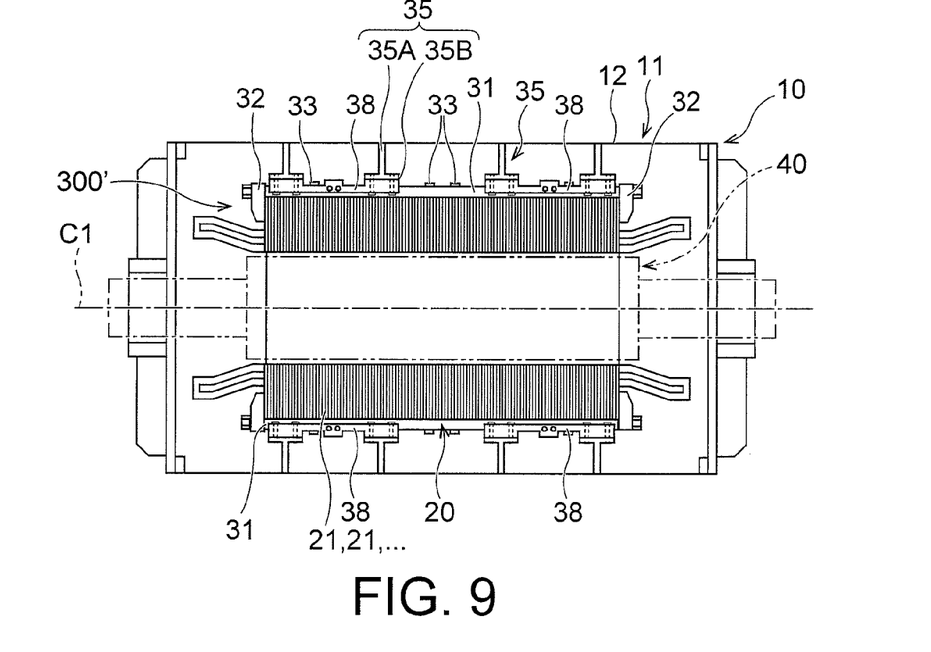
FIG. 9 is a schematic cross-sectional view of a rotating electrical machine including a general stator core support device of a type different from that of the stator core support device shown in FIG. 8.

In addition, FIG. 9 is a schematic cross-sectional view showing a rotating electrical machine including a general stator core support device different from that in FIG. 8, where the rotating electrical machine is cut taken along the axial direction. Components similar to those of the support device 300 shown in FIG. 8 are denoted by the same reference numerals. A support device 300' shown in FIG. 9 is a support device called a "spring plate type". The support device 300' includes a plurality of axial ribs 31 that holds a plurality of laminated iron cores 21 by fitting dovetail shaped grooves of the laminated iron cores 21, a pair of iron core pressing plates 32 for clamping the plurality of cylindrical laminated iron core 21 held by the ribs 31 from axial both sides, a plurality of annular iron core pressing rings 33 that surrounds and holds the ribs 31 from radially outside, a plurality of partition plates 35 fixed to the inner circumferential surface of the outer circumferential plate 12 of the stator frame 11 by welding or the like and positioned radially outside the stator core 20, and a plurality of spring plates 38 disposed to extend in the axial direction to connect a rib 31 and the partition plate 35. The configuration of the partition plate 35 is partially different from that shown in FIG. 8. The partition plate 35 in the support device 300' includes an annular base portion 35A fixed to the inner circumferential surface of the outer circumferential plate 12 so as to be positioned coaxially with the outer circumferential plate 12, and a cylindrical connecting portion 35B provided at the inner circumferential end of the base portion 35A, and the connecting portion 35B is used for connection with a spring plate 38.

Figure 10:
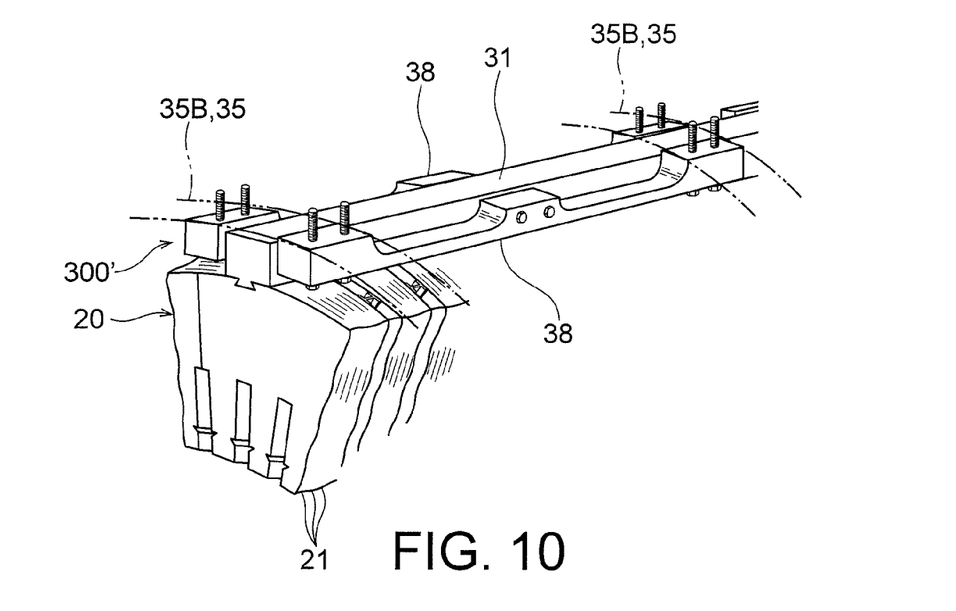
FIG. 10 is a perspective view of the stator core and the stator core support device of the rotating electrical machine shown in FIG. 9 in an overhead view.

FIG. 10 is a perspective view of the stator core 20 and the support device 300', in particular, the rib 31 and the spring plate 38 of the support device 300' in an overhead view. Referring to FIGS. 9 and 10, in the support device 300', in a state in which the stator core 20 is disposed so that the central axis of the stator core 20 coincides with the central axis of the stator frame 11, a plurality of spring plates 38 disposed in the circumferential direction connects the ribs 31 to the partition plate 35 fixed to the outer circumferential plate 12 of the stator frame 11. Specifically, a plurality of partition plates 35 is provided at intervals in the axial direction, and both ends of the spring plate 38 are connected to the respective connecting portions 35B of the partition plates 35 that are adjacent in the axial direction. On the other hand, a portion of the spring plate 38 between adjacent partition plates 35 is connected to the rib 31. The portion of the spring plate 38 between the adjacent partition plates 35 and the rib 31 are connected by bolt. As a result, the spring plate 38 bends against the radial displacement of the stator core 20, and the stator core 20 can be elastically supported.

Figure 11:
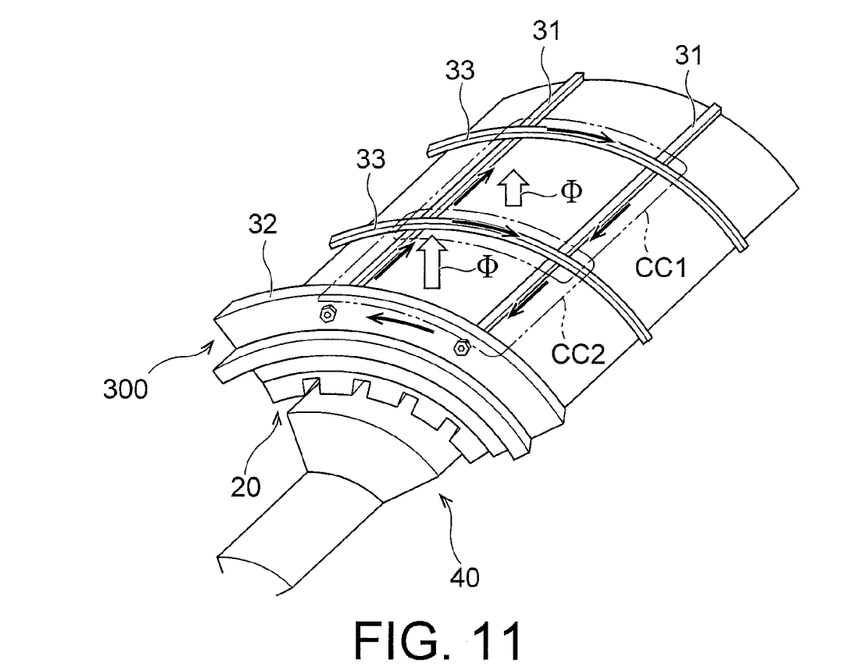
FIG. 11 is a perspective view of the stator core and the stator core support device of the rotating electrical machine shown in FIG. 8 in an overhead view.

FIG. 11 is a perspective view of the stator core 20 and the support device 300 in an overhead view. In the rotating electrical machine including the support device 300 described above, the main magnetic flux generated from the field magnet (field system) of the rotor 40 passes through the inside of the stator core 20 as shown by the arrow (hollow) direction in FIG. 11. At this time, part of the main magnetic flux leaks to the back surface (outer circumferential surface) of the stator core 20 as leakage magnetic flux 1, and can be interlinked with a closed circuit portion formed by members constituting the support device 300 of the stator core 20. Specifically, as shown in FIG. 11, the support device 300 combines members such as the ribs 31 extending in the axial direction and members such as the iron core pressing rings 33 and the iron core pressing plates 32 extending in the circumferential direction in a lattice shape, and supports the stator core 20 on the stator frame 11. By combining each member in a lattice shape, for example, the closed circuit portion (a portion surrounded by the area indicated by the two-dot chain line indicated by reference character CC1 in FIG. 11) is formed by the two ribs 31 and the two iron core pressing rings 33, and the leakage magnetic flux φ can be interlinked with this. Further, a closed circuit portion (a portion surrounded by the area indicated by the two-dot chain line indicated by reference character CC2 in FIG. 11) is formed by the two ribs 31, an iron core pressing plate 32 and the iron core pressing ring 33, and the leakage magnetic flux φ can be interlinked with this. Also in the support device 300', a closed circuit portion is formed by two ribs 31 and two iron core pressing rings 33, and a closed circuit portion is formed by the two ribs 31, the iron core pressing plate 32, and the iron core pressing ring 33, and the leakage magnetic flux CD can be interlinked with these closed circuit portions.

Figure 12:
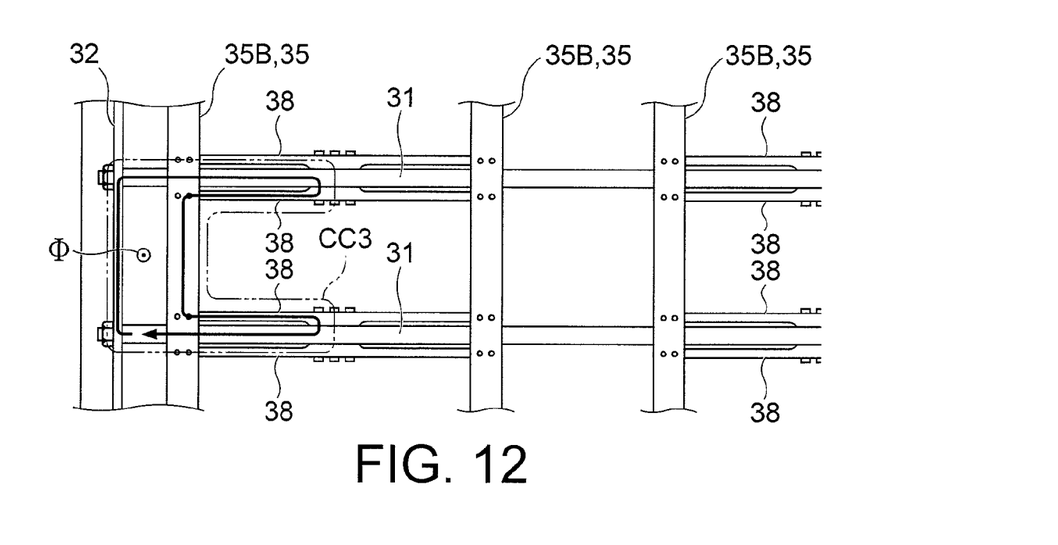
FIG. 12 is a schematic view of a rib, a spring plate, and a partition plate of the stator core support device shown in FIG. 9 when seeing the rotating electrical machine from radially outside.

FIG. 12 is a schematic view of the rib 31, the spring plate 38, and the connecting portion 35B of the partition plate 35 of the "spring plate type" support device 300' when seeing the rotating electrical machine from radially outside. As shown in FIGS. 10 and 12, in the support device 300', different spring plates 38 are connected to each rib 31 from one side and the other side in the circumferential direction. In this case, as shown by the arrow in FIG. 12, ribs 31 adjacent in the circumferential direction, the spring plates 38 adjacent in the circumferential direction between the ribs 31, a connecting portion 35B of the partition plate 35 connected to each of the spring plates 38 adjacent in the circumferential direction, and the iron core pressing plate 32 can form a closed circuit portion (a portion surrounded by the area indicated by the two-dot chain line indicated by reference character CC3 in FIG. 12). In the spring plate type support device 300', for example, the leakage magnetic flux φ can also be interlinked with the closed circuit portion CC3.

Here, since the support devices 300 and 300' are required to have mechanical strength, in general, their constituent members are made of metal, particularly iron, so that as indicated by the arrow in FIG. 11 (solid black) and the arrow in FIG. 12, magnetic flux in a direction canceling the leakage magnetic flux φ acts on in the closed circuit portion, resulting in that eddy current flows in the direction of the arrow and the eddy current loss can be generated. Such eddy current loss reduces the efficiency of the rotating electrical machine. When such eddy current is generated, the temperature of the support devices 300 and 300' rises, the fastening force of the fastening portion decreases due to the thermal expansion of the members constituting the support devices 300 and 300', and there can be a problem in that the vibration of the stator core 20 increases.

In recent years, it is desired for a generator to achieve both an increase in magnetic flux for increasing the power generation output, and its compactness. However, if the size of the rotating electrical machine is reduced while increasing the magnetic flux, the leakage of magnetic flux is likely to increase. In this case, if the thickness of the stator core is reduced, the leakage of the magnetic flux may become remarkably large in some cases. Therefore, in order to achieve both an increase in magnetic flux from the rotor and its compactness, it is required to take measures to sufficiently suppress leakage of the magnetic flux.

DETAILED DESCRIPTION

The stator core support device according to the embodiment includes plural types of support members that support a stator core on a stator frame disposed radially outside the stator core, wherein the plural types of support members are combined so as to form a closed circuit portion, and wherein an insulating part (insulating member, insulating material) that electrically insulates part of the closed circuit portion is provided.

In addition, the rotating electrical machine according to the embodiment includes a stator configured to support a stator core on a stator frame which is radially outside of the stator core by the above stator core support device, and a rotor.

Embodiments will now be explained with reference to the accompanying drawings. The same reference numerals are given to the same components as those of the rotating electrical machine shown in FIGS. 8 to 12 among the components in each embodiment described below, and the description of the common components may be omitted.

First Embodiment

Figure 1:
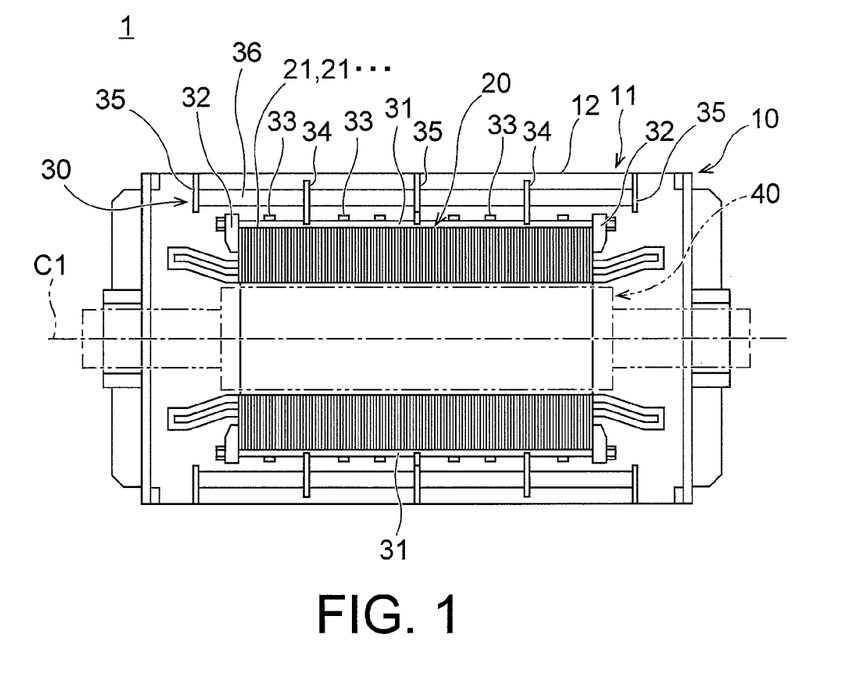
FIG. 1 is a schematic cross-sectional view of a rotating electrical machine according to a first embodiment.

FIG. 1 is a schematic cross-sectional view of a rotating electrical machine 1 according to the first embodiment which is cut along the axial direction. The rotating electrical machine 1 shown in FIG. 1 is a rotary field type rotating electrical machine and includes a stator 10 and a rotor 40 that rotates around a rotation center axis C1 radially inside of the stator 10. A field coil (not shown) is provided in the rotor 40. In the present embodiment, when referring to the axial direction, the direction means a direction along the rotation center axis C1, and when referring to the radial direction, the direction means a direction orthogonal to the rotation center axis C1. Further, a direction rotating about the rotation center axis C1 is referred to as a circumferential direction. In FIG. 1, hatching of each constituent element of the rotating electrical machine 1 is omitted for convenience of explanation, and the rotor 40 is indicated by a two-dot chain line.

The stator 10 includes a cylindrical stator core 20 formed so as to surround the rotor 40, a stator frame 11 including a cylindrical outer circumferential plate 12 covering the stator core 20 from radially outside and being supported by a foundation, and a stator core support device (hereinafter abbreviated as a support device) 30 for supporting the stator core 20 on the stator frame 11.

The stator core 20 is formed by laminating a plurality of annular laminated iron cores 21 into a cylindrical shape, and a dovetail shaped groove is formed on the outer circumferential portion of each laminated iron core 21, and these grooves are formed at intervals in the circumferential direction. The laminated iron core 21 is formed by punching, and the surface is insulated after formation. Therefore, insulation is secured between the adjacent laminated iron cores 21 after lamination.

A support device 30 is a support device called "spring rod type". The support device 30 includes, as a support member combined so as to form a closed circuit portion which will be described in detail later, a plurality of axial ribs 31 that holds the stator core 20 including a plurality of laminated iron cores 21 by fitting dovetail shaped grooves of the respective laminated iron cores 21, a pair of iron core pressing plates (core end flanges) 32 for clamping a plurality of cylindrical laminated iron cores 21 held by the ribs 31 from axial both sides, in other words, from both end sides of the ribs 31 in the axial direction, a plurality of annular iron core pressing rings 33 that surrounds and holds the ribs 31 from radially outside, a plurality of annular iron core support plates 34 that surrounds and holds the ribs 31 from radially outside and that protrudes radially outward from the iron core pressing rings 33, a plurality of annular partition plates 35 fixed to the inner circumferential surface of the outer circumferential plate 12 by welding or the like so as to be positioned coaxially with the outer circumferential plate 12 of the stator frame 11, and positioned radially outward of the stator core 20, and a spring rod(s) 36 extending in the axial direction to connect the iron core support plate 34 and the partition plate 35.

In the present embodiment, a plurality of ribs 31 is disposed on the inner circumferential surface of the iron core support plate 34 at intervals in the circumferential direction and fixed by bolt or the like. The rib 31 is pressed by the iron core pressing ring 33. The iron core pressing ring 33 is fastened in the circumferential direction by a mechanism (not shown), and as a result it presses the rib 31. A plurality of spring rods 36 is disposed in the circumferential direction, and connects the iron core support plates 34 to the partition plates 35. At this time, a spring rod 36 extends beyond axial both sides of the stator core 20, and the partition plate 35 and the iron core support plate 34 are alternately disposed in the axial direction. Therefore, the spring rod 36 is held by the adjacent partition plates 35 in a state of being held at both ends (two-points), and is connected to the iron core support plate 34 between the adjacent partition plates 35. As a result, the spring rod 36 bends against the radial displacement of the iron core support plate 34, and the stator core 20 is elastically supported with respect to the stator frame 11.

Figure 2A:
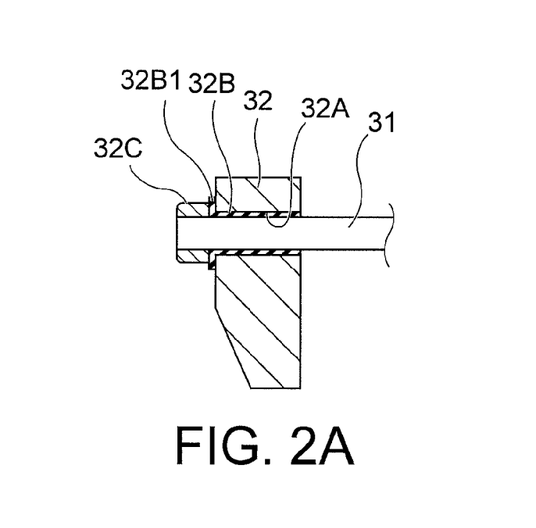
FIG. 2A is a detailed cross-sectional view of a main portion of a stator core support device in the rotating electrical machine shown in FIG. 1.

The support device 30 according to the present embodiment, as in the support device 300 shown in FIG. 8, combines, in a lattice shape, members (axial members) such as ribs 31 and spring rods 36 extending in the axial direction with members (circumferential members) such as the iron core pressing plate 32, the iron core pressing ring 33, the iron core support plate 34, and the partition plate 35 that extend in the circumferential direction and supports the stator core 20 on the stator frame 11. Therefore, a closed circuit portion through which eddy current due to a magnetic flux generated from the rotor 40 can flow is formed. Specifically, in the support device 30, although not shown, as in the example shown in FIG. 11, a closed circuit portion CC1 formed by the two ribs 31 and the two iron core pressing rings 33 and a closed circuit portion CC2 formed by the two ribs 31, the iron core pressing plate 32, and the iron core pressing ring 33 are formed. On the other hand, in the present embodiment, the rib 31 and the iron core pressing plate 32 are electrically insulated from each other, and the rib 31 and the iron core pressing ring 33 are electrically insulated from each other. FIG. 2A is a detailed cross-sectional view of a connecting part between the rib 31 and the iron core pressing plate 32, and FIG. 2B is a detailed cross-sectional view of a connecting portion between the rib 31 and the iron core pressing ring 33.

The rib 31 extends beyond the axial both sides of the stator core 20, and the rib 31 penetrates the iron core pressing plate 32 in the axial direction. In the example shown in FIG. 2A, a cylindrical insulating sleeve 32B is provided in an insertion hole 32A that penetrates the iron core pressing plate 32 in the axial direction in order to pass the end portion of the rib 31. The end portion of the rib 31 passes through the insulating sleeve 32B and protrudes from the insulating sleeve 32B, and an insulating nut 32C is threadedly attached to the protrusion portion. The insulating nut 32C is provided for tightening the stator core 20 via the iron core pressing plate 32 by being tightened toward the axially center side of the rib 31. A flange portion 32B1 is formed at the end of the insulating sleeve 32B on the insulating nut 32C side and the flange portion 32B1 is positioned between the insulating nut 32C and the iron core pressing plate 32. As a result, the rib 31 and the iron core pressing plate 32 are electrically insulated. That is, the rib 31 and the iron core pressing plate 32 are electrically insulated because they are in contact with each other through the insulating sleeve 32B and the insulating nut 32C as insulating parts. The material of the insulating sleeve 32B and the insulating nut 32C is not particularly limited as long as the insulation can be secured. For example, the insulating sleeve 32B may be made of an insulating resin material ensuring heat resistance, the insulating nut 32C is made of a non-magnetic metallic material, and the insulation may be secured by varnishing the surface.

Figure 2B:
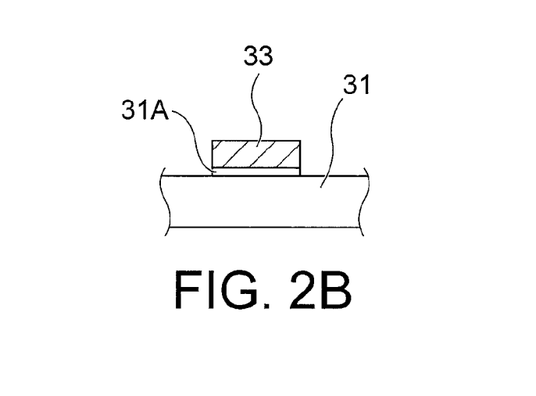
FIG. 2B is a detailed cross-sectional view of the main portion of the stator core support device in the rotating electrical machine shown in FIG. 1.

On the other hand, in the example shown in FIG. 2B, an insulative member 31A is disposed between the rib 31 and the iron core pressing ring 33. The iron core pressing ring 33 presses the rib 31 via the insulative member 31A, whereby the rib 31 and the iron core pressing ring 33 are electrically insulated from each other. That is, the rib 31 and the iron core pressing ring 33 are electrically insulated because they are in contact with each other via the insulative member 31A as an insulating part. The material of the insulative member 31A is not particularly limited as long as insulation can be secured. Instead of the insulative member 31A, an insulating film may be formed on the rib 31 by a varnish treatment.

Next, the operation according to the present embodiment will be described taking as an example a case where the rotating electrical machine 1 functions as a generator. In this case, first, current is supplied to the field coil of the rotor 40, and the field coil of the rotor 40 functions as an electromagnet. In this state, the rotor 40 is rotated so that the magnetic flux from the field coil passes through the stator coil on the inner circumferential surface of the stator core 20, whereby power generation is performed. At this time, when the magnetic flux generated from the field coil reaches the back surface of the stator core 20, that is, leaks radially outward, the magnetic flux may pass through a closed circuit portion formed by members constituting the support device 30, and at this time, the eddy current will flow through the closed circuit portion.

Here, in the present embodiment, as described above, the rib 31 and the iron core pressing plate 32 which are capable of forming the closed circuit portion are electrically insulated, and the rib 31 and the iron core pressing ring 33 are electrically insulated to each other. As a result, eddy current caused by leakage magnetic flux is prevented from flowing in the closed circuit portion formed these members. That is, although the rib 31 and the iron core pressing plate 32 can form the closed circuit portion CC2 (see FIG. 11) together with adjacent another rib 31 and adjacent another iron core pressing ring 33, in the closed circuit portion CC2, since the rib 31 and the iron core pressing plate 32 are electrically insulated, the eddy current is prevented from flowing. Further, although the rib 31 and the iron core pressing ring 33 can form the closed circuit portion CC1 (see FIG. 11) together with adjacent another rib 31 and adjacent another iron core pressing ring 33, in this closed circuit portion CC1, since the rib 31 and the iron core pressing ring 33 are electrically insulated, the eddy current is prevented from flowing. Thus, the eddy current loss can be suppressed, and the thermal elongation of the constituent members of the support device 30 due to the temperature rise of the support device 30 can be suppressed.

As described above, according to the present embodiment, eddy current loss and temperature rise which may be caused by the magnetic flux leaking from the stator core 20 can be suppressed, and it is possible to suppress the reduction in the operation efficiency of the rotating electrical machine 1 and the occurrence of vibration. Further, in the present embodiment, since the surface of each laminated iron core 21 is insulated, the eddy current that short-circuits each laminated iron core 21 does not occur. Further, although the partition plate 35 of the support device 30 and the stator frame 11 are not insulated, even if the stator frame 11 forms a circuit through which eddy current can flow, the circuit is large and the impedance is high, whereby problem with the eddy current rarely occurs.

Figure 3:
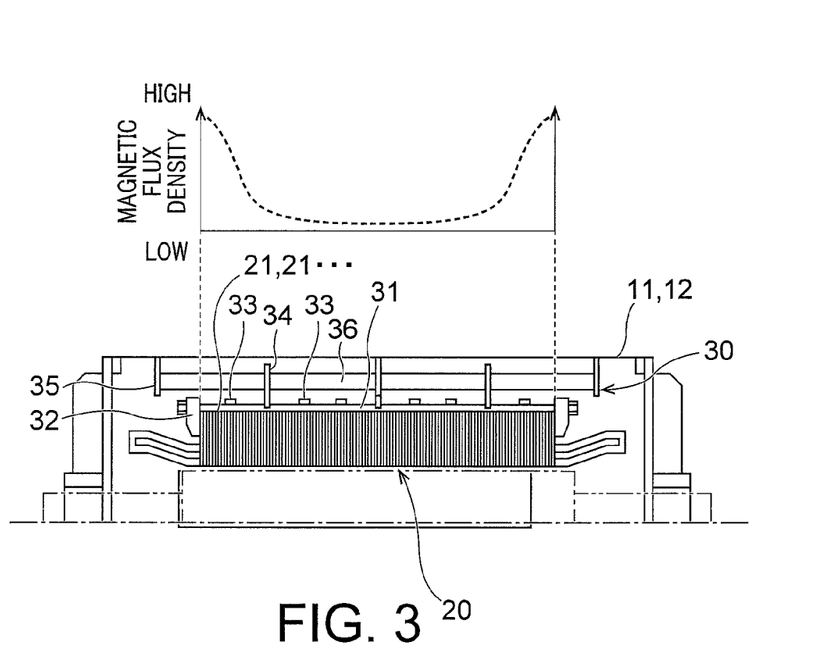
FIG. 3 is a diagram showing an example of a distribution of magnetic flux density at the radially outside of the stator core in the rotating electrical machine shown in FIG. 1.

FIG. 3 shows an example of the distribution of the magnetic flux density at the radially outside of the stator core 20 in the rotating electrical machine 1. As shown in the figure, the magnetic flux which leaks radially outward of the stator core 20 increases at the end of the stator core 20 in the axial direction, and the magnetic flux density increases. On the other hand, at the central portion of the stator core 20 in the axial direction, the magnetic flux which leaks radially outward of the stator core 20 is small and the magnetic flux density is low. Considering such characteristics, probably the members constituting the support device 30 can suppress adverse effect due to magnetic flux only by being partially insulated only in a region of the stator core 20 on the axial end side. Therefore, for example, insulation may be secured only between the rib 31 of the stator core 20 on the axial end side and the iron core pressing ring 33. Insulation may be secured only between the rib 31 and the iron core pressing plate 32. In such a case, it is possible to economically suppress eddy current loss and temperature rise which can be caused by the magnetic flux leaking from the stator core 20.

In this embodiment, the ribs 31 and the iron core pressing plate 32 are electrically insulated, and the rib 31 and the iron core pressing ring 33 are electrically insulated. Other members may be insulated. For example, the spring rod 36 and the partition plate 35 may be electrically insulated, or the spring rod 36 and the iron core support plate 34 may be electrically insulated.

Second Embodiment

Next, a second embodiment will be described. The same reference numerals are given to the same components as those of the rotating electrical machine shown in FIGS. 8 to 12 and those of the first embodiment among the components in each embodiment described below, and the description of the common components may be omitted.

Figure 4:
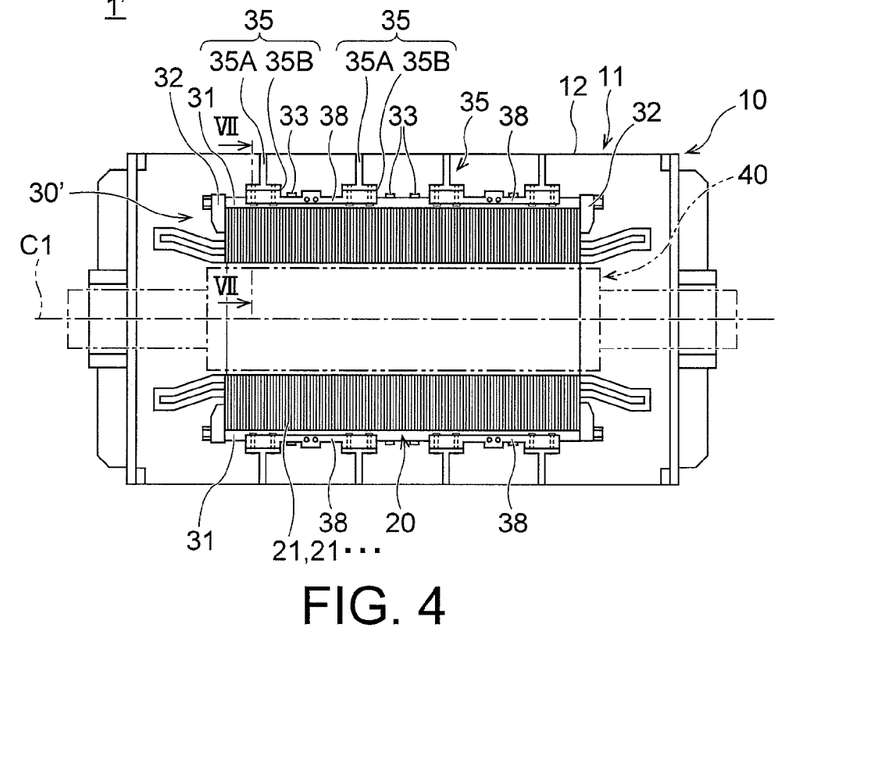
FIG. 4 is a schematic cross-sectional view of a rotating electrical machine according to a second embodiment.
Figure 5:
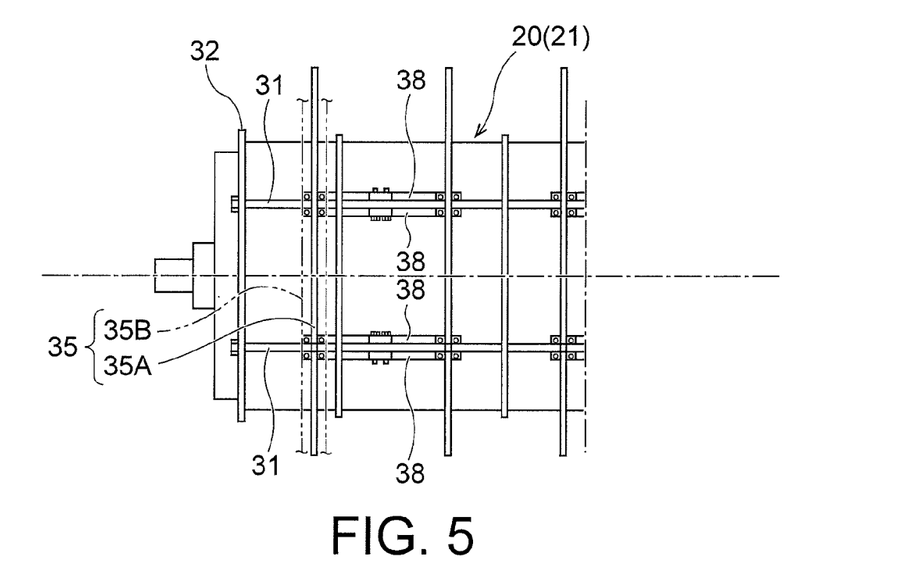
FIG. 5 is a view of the stator core and the stator core support device of the rotating electrical machine shown in FIG. 4 as viewed from radially outside.

FIG. 4 is a schematic cross-sectional view showing a rotating electrical machine 1' according to the second embodiment which are cut along the axial direction, and FIG. 5 is a view of the stator core 20 and a stator core support device 30' (hereinafter abbreviated as a support device 30') of the rotating electrical machine 1' as viewed from radially outside. In the present embodiment, the configuration of the stator core support device 30' is different from that of the first embodiment. In FIG. 4, hatching of each constituent element of the rotating electrical machine 1' is omitted for convenience of explanation as in FIG. 1.

As shown in FIGS. 4 and 5, the support device 30' is a support device called a "spring plate type". The support device 30' includes, as a support member combined so as to form a closed circuit portion which will be described in detail later, a plurality of axial ribs 31 that holds the stator core 20 including a plurality of laminated iron cores 21 by fitting dovetail shaped grooves of the respective laminated iron cores 21, a pair of iron core pressing plates 32 for clamping a plurality of cylindrical laminated iron cores 21 held by the ribs 31 from axial both sides, in other words, from both end sides of the ribs 31 in the axial direction, a plurality of annular iron core pressing rings 33 that surrounds and holds the ribs 31 from radially outside, a plurality of partition plates 35 fixed to the inner circumferential surface of the outer circumferential plate 12 of the stator frame 11 by welding or the like and positioned radially outward of the stator core 20, and a plurality of spring plates 38 disposed to extend in the axial direction to connect the rib 31 and the partition plate 35.

As shown in FIG. 5, a plurality of ribs 31 is disposed at intervals in the circumferential direction. The spring plate 38 is connected to the rib 31 in the circumferential direction and is interposed between the rib 31 and the stator frame 11 so as to elastically support the stator core 20 to the stator frame 11. Two spring plates 38 are provided on one rib 31 at each of a plurality of attachment positions intermittently determined in the axial direction so that the two spring plates 38 hold the ribs 31 from circumferential both sides at each attachment position and is connected to the rib 31. In other words, different spring plates 38 are connected to each rib 31 from one side and the other side in the circumferential direction. Further, the spring plate 38 is away radially outward from the outer circumferential surface of the stator core 20. The spring plate 38 is connected to the rib 31 at, for example, a central portion, which is a portion between the axial both ends of the spring plate 38, and its both ends are connected to mutually different partition plates 35. A plurality of partition plates 35 is disposed at intervals in the axial direction. The partition plate 35 has a base portion 35A fixed to the inner circumferential surface of the outer circumferential plate 12 so as to be positioned coaxially with the outer circumferential plate 12 and a connecting portion 35B provided at the inner circumferential end of the base portion 35A. For convenience of explanation, the connecting portion 35B is indicated by a two-dot chain line in FIG. 5. Referring to FIG. 10, both ends of the spring plate 38 are connected to the respective connecting portions 35B of the partition plates 35 that are adjacent in the axial direction. On the other hand, the portion of the spring plate 38 between the adjacent partition plates 35, for example the central part of the spring plate 38, is connected to the rib 31. The portion of the spring plate 38 between the adjacent partition plates 35 and the rib 31 are connected by bolt. As a result, the spring plate 38 bends against the radial displacement of the stator core 20, and the stator core 20 can be elastically supported. Although the connecting portion 35B in the present embodiment is cylindrical, it may be configured as a curved portion provided so as to be aligned with the position of the spring plate 38.

Figure 6:
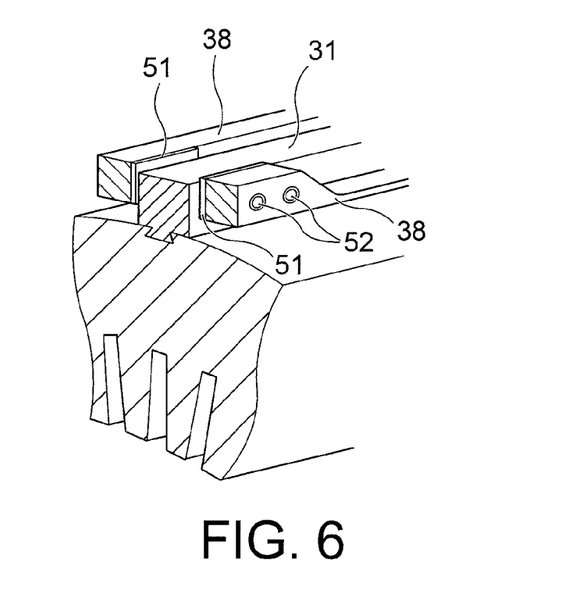
FIG. 6 is a perspective view of a main portion of the stator core support device in the rotating electrical machine shown in FIG. 4.
Figure 7:
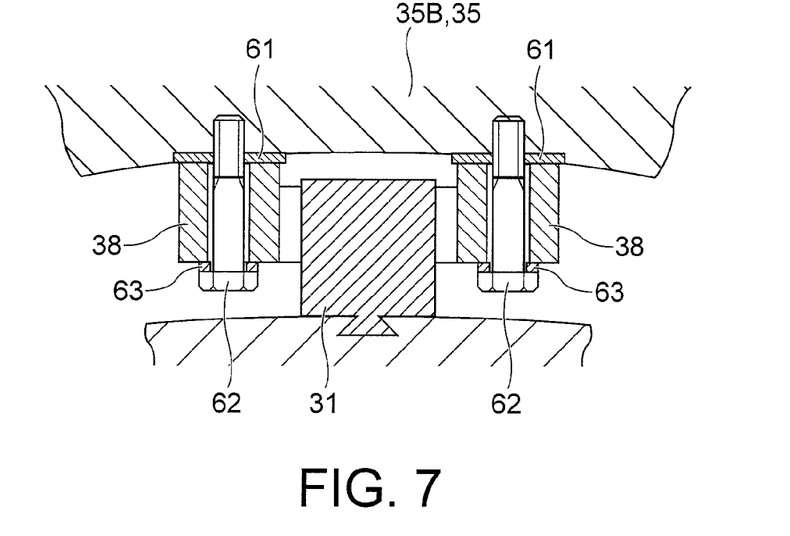
FIG. 7 is a cross-sectional view taken along line VII-VII of FIG. 4.

FIG. 6 is a perspective view showing a connecting part between the rib 31 and the spring plate 38, and FIG. 7 is a cross-sectional view taken along line VII-VII in FIG. 4 of a connecting part between the partition plate 35 and the spring plate 38. In the present embodiment, the ribs 31 and the spring plate 38 corresponding to two kinds of mutually different axial members are electrically insulated, and the partition plate 35 corresponding to the circumferential member and the spring plate 38 corresponding to the axial member are electrically insulated.

More specifically, as shown in FIG. 6, the rib 31 and the spring plate 38 are disposed such that an insulating plate member 51 is disposed between the rib 31 and the spring plate 38, and an insulating bolt 52 extending from the spring plate 38 to the rib 31 via the insulating plate member 51 is fastened to the rib 31 so as to be integrated and insulated from each other. That is, the rib 31 and the spring plate 38 are electrically insulated because they are in contact with each other through the insulating plate member 51 and the insulating bolt 52 as insulating parts. As shown in FIG. 7, an insulating plate member 61 is disposed between the spring plate 38 and the partition plate 35, and an insulating bolt 62 extending from the spring plate 38 to the partition plate 35 via the insulating plate member 61 is fastened to the partition plate 35 so as to be integrated and insulated from each other. Furthermore, an insulating washer 63 is provided between the spring plate 38 and the head of the insulating bolt 62. That is, the spring plate 38 and the partition plate 35 are electrically insulated because they are in contact with each other via the insulating plate member 61, the insulating bolt 62, and the insulating washer 63 as an insulating part.

The material of the insulating plate members 51 and 61, the insulating bolts 52 and 62, and the insulating washer 63 is not particularly limited as long as insulations can be secured. For example, the insulating plate members 51 and 61 may be made of an insulating resin material ensuring heat resistance. Further, the insulating bolts 52 and 62 and the insulating washer 63 may be made of a non-magnetic metallic material and the surface may be subjected to a varnish treatment to ensure insulation.

In the present embodiment as described above, for example, the rib 31, the two spring plates 38, and the partition plate 35 can form a closed circuit portion. Also, referring to FIGS. 5 and 12, the adjacent ribs 31 in the circumferential direction, the adjacent spring plates 38 in the circumferential direction between the adjacent ribs 31 in the circumferential direction, an iron core pressing plate 32 which is a circumferential member which is in contact with the adjacent ribs 31 in the circumferential direction and is not in contact with the spring plates 38, and the partition plate 35 which is a circumferential member which is in contact with the adjacent spring plates 38 in the circumferential direction and is not in contact with the rib 31, can form a closed circuit portion CC3 (see FIG. 12). However, in these closed circuit portions, since the rib 31 and the spring plate 38 are electrically insulated and the spring plate 38 and the partition plate 35 are electrically insulated, eddy current is prevented from flowing due to the magnetic flux leaking from the stator core 20. Thus, the eddy current loss can be suppressed, and the thermal elongation of the constituent members of the support device 30' due to the temperature rise of the support device 30' can also be suppressed. Therefore, also in the present embodiment, eddy current loss and temperature rise which may be caused by the magnetic flux leaking from the stator core 20 are suppressed, and it is possible to suppress the reduction in the operation efficiency of the rotating electrical machine 1' and the occurrence of vibration. It should be noted that the constituent members of the support device 30' in the present embodiment may also be partially insulated only in a region of the stator core 20 on the axial end side.

In this embodiment, the rib 31 and the spring plate 38 are electrically insulated and the partition plate 35 and the spring plate 38 are electrically insulated. However, the rib 31 and the iron core pressing ring 33 may be insulated from each other or the rib 31 and the iron core pressing plate 32 may be insulated.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fail within the scope and sprit of the invention.

The invention claimed is:

1. A stator core support device comprising:
   plural types of support members that support a stator core on a stator frame disposed radially outward of the stator core,
   wherein the plural types of support members are combined so as to form a closed circuit portion,
   wherein an insulating part that electrically insulates part of the closed circuit portion is provided,
   wherein the plural types of support members include a plurality of axial members extending in an axial direction of the stator core and a plurality of circumferential members extending in a circumferential direction of the stator core,
   wherein the axial members comprise a plurality of ribs which is disposed at intervals in the circumferential direction and is adapted to hold the stator cores by fitting a groove formed in an outer circumferential portion of the stator core, and a plurality of spring plates connected to the ribs in a circumferential direction and interposed between the ribs and the stator frame for elastically supporting the stator core,
   wherein the spring plates different from each other are connected to each of the ribs from one side and the other side in the circumferential direction,
   wherein the adjacent ribs in the circumferential direction, the adjacent spring plates in the circumferential direction between the adjacent ribs in the circumferential direction, the circumferential members which are in contact with the adjacent ribs in the circumferential direction and which are not in contact with the spring plates, and the circumferential members which are in contact with the adjacent spring plates in the circumferential direction and which are not in contact the ribs form the closed circuit portion, form the closed circuit, and
   wherein the ribs and the spring plates forming part of the closed circuit portion are electrically insulated with the ribs and the spring plates contacting each other via the insulating part.

2. The stator core support device according to claim 1, wherein the spring plates and the circumferential members contacting the spring plates, which form part of the closed circuit portion, are further electrically insulated with the spring plates and the circumferential members contacting each other via the insulating part.

3. The stator core support device according to claim 2, wherein the insulating part includes an insulating plate member disposed between the spring plate and the circumferential member in contact with the spring plate, and an insulating bolt extending from the spring plate to the circumferential members via the insulating plate member.

4. The stator core support device according to claim 1, wherein the insulating part includes an insulating plate member disposed between the rib and the spring plate and an insulating bolt extending from the spring plate to the rib through the insulating plate member.

5. A rotating electrical machine comprising a stator configured to support a stator core on a stator frame which is radially outside of the stator core by the stator core support device according to claim 1 and a rotor.

6. A stator core support device comprising:
   plural types of support members that support a stator core on a stator frame disposed radially outward of the stator core,
   wherein the plural types of support members are combined so as to form a closed circuit portion,
   wherein an insulating part that electrically insulates part of the closed circuit portion is provided,
   wherein the plural types of support members include a plurality of axial members extending in an axial direction of the stator core and a plurality of circumferential members extending in a circumferential direction of the stator core,
   wherein, of the plural types of support members, two axial members spaced apart in the circumferential direction and two circumferential members spaced apart in the axial direction form the closed circuit portion,
   wherein the axial members and the circumferential members forming part of the closed circuit portion are electrically insulated with the axial members and the circumferential members contacting each other via the insulating part,
   wherein the axial members include shaft-like ribs adapted to hold the stator core by fitting a groove formed in an outer circumferential portion of the stator core,
   wherein the circumferential members include annular iron core pressing rings that surround and hold the ribs from radially outside, and
   wherein the ribs and the iron core pressing rings are electrically insulated with the ribs and the iron core pressing rings contacting each other via the insulating part.

7. A rotating electrical machine comprising a stator configured to support a stator core on a stator frame which is radially outside of the stator core by the stator core support device according to claim 6 and a rotor.

8. A stator core support device comprising:
   plural types of support members that support a stator core on a stator frame disposed radially outward of the stator core,
   wherein the plural types of support members are combined so as to form a closed circuit portion, and
   wherein an insulating part that electrically insulates part of the closed circuit portion is provided,
   wherein the plural types of support members include a plurality of axial members extending in an axial direction of the stator core and a plurality of circumferential members extending in a circumferential direction of the stator core,
   wherein, of the plural types of support members, two axial members spaced apart in the circumferential direction and two circumferential members spaced apart in the axial direction form the closed circuit portion,
   wherein the axial members and the circumferential members forming part of the closed circuit portion are electrically insulated with the axial members and the circumferential members contacting each other via the insulating part, wherein the axial members include shaft-like ribs adapted to hold the stator core by fitting a groove formed in an outer circumferential portion of the stator core, wherein the circumferential members include an annular iron core pressing plate for contacting the stator core and for fastening the stator core in the axial direction from both end sides of the ribs, and wherein the ribs and the iron core pressing plates are electrically insulated with the ribs and the iron core pressing plates contacting each other via the insulating part.

9. A rotating electrical machine comprising a stator configured to support a stator core on a stator frame which is radially outside of the stator core by the stator core support device according to claim 8 and a rotor.

\* \* \* \* \*